United States Patent [19]

Takeda et al.

[11] Patent Number: 5,020,886
[45] Date of Patent: Jun. 4, 1991

[54] FRESNEL LENS TYPE COMPLEX REFLECTION SYSTEM HAVING A LENS FUNCTION

[75] Inventors: Tatsuoki Takeda; Goro Miyamoto, both of Naka, Japan

[73] Assignee: Japan Atomic Energy Research Institute, Tokyo, Japan

[21] Appl. No.: 351,664

[22] Filed: May 15, 1989

[30] Foreign Application Priority Data

Jul. 5, 1988 [JP] Japan .................................. 63-167340

[51] Int. Cl.$^5$ .............................................. G02B 5/12
[52] U.S. Cl. .................................... 350/409; 350/452; 350/630
[58] Field of Search ............... 350/435, 409, 452, 629, 350/630

[56] References Cited

U.S. PATENT DOCUMENTS 4,006,971  2/1977  Plummer ............................. 350/629
4,035,064  7/1977  Cowman, Jr. et al. ............. 350/630
4,050,444  9/1977  Dolamore ............................ 350/452

Primary Examiner—Bruce Y. Arnold
Assistant Examiner—Rebecca D. Gass
Attorney, Agent, or Firm—Oblon, Spivak, McClelland, Maier & Neustadt

[57] ABSTRACT

The present invention pertains to a Fresnel lens type complex reflecting system in which a set of parabolic mirrors are utilized to function as a convex lens. This is accomplished through incident light rays impinging on concave surfaces of the parabolic mirrors. In this way, the focal point of the complex reflecting system will be on an opposite side of the complex reflecting system as the direction of incident light. Another feature of the present invention is an orientation of a set of parabolic mirrors which function to operate as a concave lens. This is accomplished through incident light rays impinging on convex surfaces of the parabolic mirrors.

4 Claims, 2 Drawing Sheets

FRESNEL LENS TYPE COMPLEX REFLECTION SYSTEM HAVING A LENS FUNCTION

BACKGROUND OF THE INVENTION

1. Field of the Invention

The present invention relates to a Fresnel lens type complex reflection system.

2. Description of the Prior Art

An ordinary method of converging and diverging a light is to either use a paraboidal mirror (generally referred to as a conicoidal mirror) or a lens.

However, these methods have the following problems:

First, regarding the former method, (1) if planning to make a large caliber reflecting mirror, either the focal length will need to be long or the depth of the mirror will need to be great, and thereby the whole size of the mirror will increase greatly, and (2) if considering a case in which the light converged at a focal point is utilized, a means for taking out and utilizing the light is a hindrance to an incident ray since both the incident ray and the focal point are on the same side of the mirror.

This is the same also in case the direction of light is opposite.

And on the latter method, (3) the range of wave-lengths utilizable is narrow since the refraction of an incident ray in a solid medium is utilized;

(4) the method cannot be used for this same reason since the medium is broken when the strength of light is too high; and (5) it is difficult to avoid the chromatic aberration which results from utilizing the refraction of an incident ray.

SUMMARY OF THE INVENTION

An object of the present invention is to overcome these problems and to provide a complex reflection system in which light is introduced into the opposite side of incident ray on mirror body, similarly as in a lens, by using only a reflection phenomenon and without using a refraction phenomenon.

BRIEF DESCRIPTION OF THE DRAWING

In FIG. 1 F is a common focus; D are reflected rays of incident rays L (R) on a concave surface of B (A) and U are reflected rays of rays R (L) on a convex surface of B (A).

In FIG. 2 P1, P2 - - -, P6 are a group of parabolas having a common focus F; M1, M2 - - -, M6 are element mirrors constituting the complex reflecting system; and L1, L2, - - -, L7' are reflected rays.

In FIG. 3 P1, P2 - - -, P6 are a group of parabolas having a common focus F; M1, M2 - - -, M6 are element mirrors constituting the complex reflecting system; and L1, L2, - - -, L7 are incident rays and L1', L2' - - -, L7' are reflected rays.

In FIG. 4 P1, P2 - - -, P6 are a group of parabolas having a common focus F; M1, M2 - - -, M6 are element mirrors constituting the complex reflecting system; and L1, L2, - - -, L7 are incident rays and L1', L2' - - -, L7' are reflected rays.

DESCRIPTION OF THE PREFERRED EMBODIMENT

The present complex reflection system has a function of a pseudo-lens constituted by arranging reflective mirror surfaces divided to appropriate geometrical shapes, and so refers to a Fresnel lens type complex reflection system (hereinafter referred to as the "complex reflection system") corresponding to a Fresnel lens which is constituted of divided lenses.

For simplifying the explanation, a complex reflection system using a confocal paraboidal mirror is shown herein.

A parabola represented by the following formula is considered.

$$y = x^2/4a - a$$

$$(a > 0 \text{ or } a < 0)$$

When changing the value of constant a in the formula, the focus meets the origin and a group of confocal parabolas having a vertex at points of $(x=0, y=-a)$ is obtained.

Figure 1:
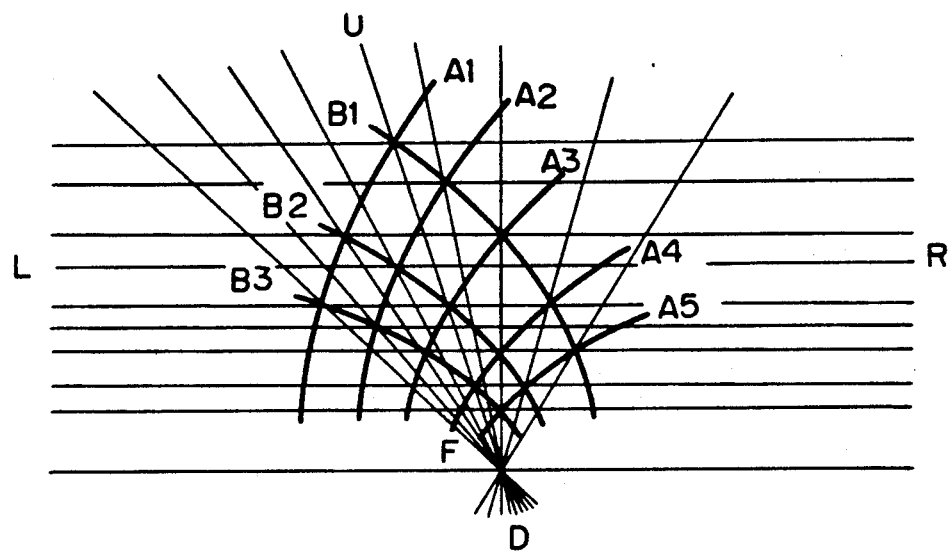
FIG. 1 is a diagram showing a group of confocal reflecting surfaces $A_1$, $A_2$, $A_3$ - - - and another group of confocal reflecting surfaces $B_1$, $B_2$, $B_3$ - - - which cross them, respectively, at right angles.
Figure 2:
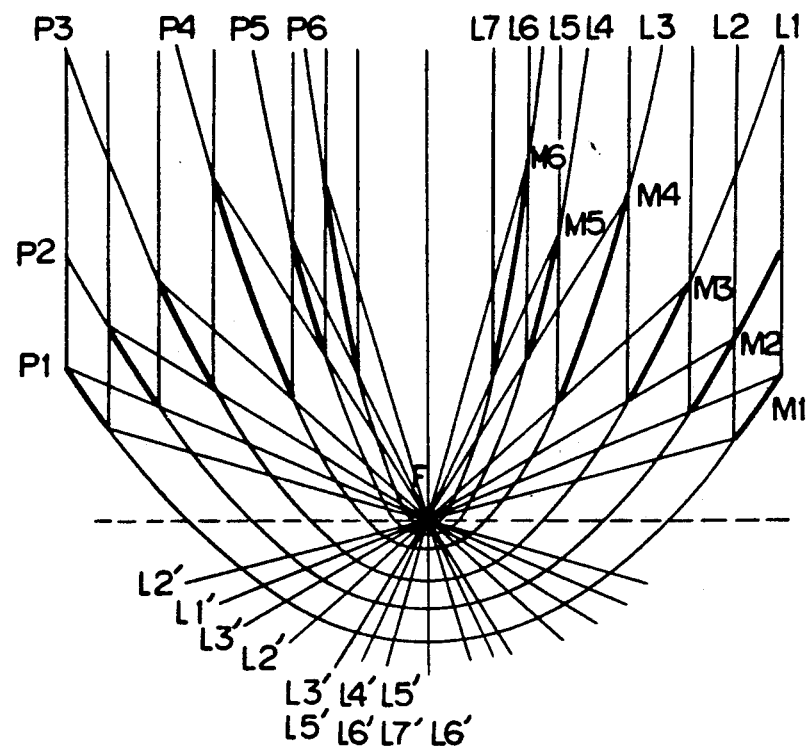
FIG. 2 is a diagram showing an example of a complex reflection system having a function of a convex lens by utilizing a group of confocal paraboidal mirrors of $a > 0$.

According to an object of the present invention, a set consisting of limited numbers of confocal parabola group is selected from among this group of confocal parabolas (FIG. 2, P1, P2, - - -, P6).

Considering a light flux from the above parallel to the axis of parabola, the most outside incident ray on the right is taken as L1. Next, a section of the most outside parabola P1 cut off by the rays L2 and L1 parallel to the axis is taken as M1. A section of the second parabola P2 from the outside cut off so as not to intercept the light flux from M1 to the focal point and incident light flux is taken as M2. A group of sections M3, M4, - - - cut off from the confocal parabola group are obtained by repeating this operation. Thus, a circular complex reflection system having curved surfaces obtained by rotating the group of sections around the axis as a mirror surface can be obtained.

And also a cylindrical complex reflection system having a focal line instead of a focus (focal point) can be constituted by making a cylindrical surface having the group of sections as a bottom and using it as a mirror.

As is evident from the figures, in a case of the complex reflection system on the basis of FIG. 2, parallel rays incident from the above converge at a focal point which is present behind the mirror body for the incident ray. And Fresnel mirrors different in shape and performance can be realized by selecting different constant a of the parabola group.

What is shown in FIG. 2 is a complex reflection system having the function of a convex lens. However, when utilizing the convex surface of mirror for $a < 0$, a complex reflection system having the function of a concave lens, as shown in FIG. 3, can be realized.

Figure 3:
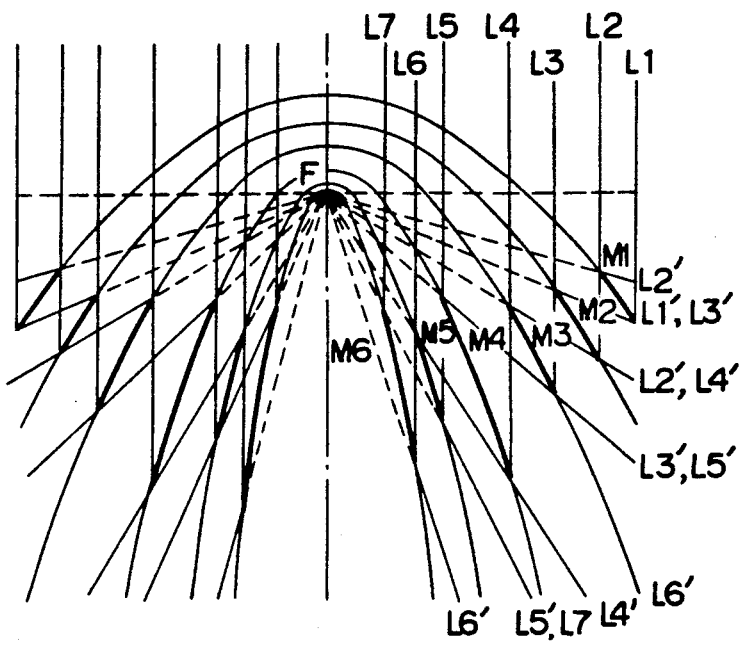
FIG. 3 is a diagram showing an example of a complex reflection system having a function of a concave lens by a group of confocal paraboidal mirrors of $a < 0$.
Figure 4:
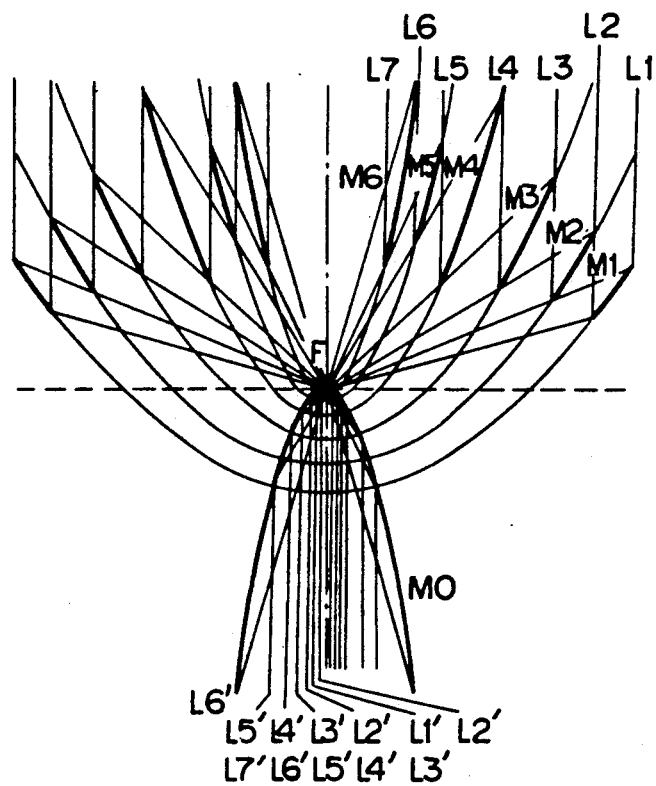
FIG. 4 is a diagram showing a complex reflection system constituted in such a manner that the diameter of light flux is changed by reflective surfaces M1, M2 - - - made from a group of parabolas of $a > 0$ having a focus F and a reflective surface M0 made from a parabola of $a > 0$.

And the complex reflection systems shown in FIGS. 2 and 3 utilize confocal paraboids of a>O and a<O, respectively. However, a system converting the diameter of parallel rays as shown in FIG. 4, can be made by mixing the group of confocal paraboids of a>O and a<O which are in the relations of crossing at right angles.

The case of a paraboidal mirror is herein described, but further, also in the case of a non-paraboidal mirror a complex reflection system can be constituted in the same method.

In such a complex reflection system, all the problems (1)~(5) found in the common curved surface mirror and lens are solved. In particular, by adopting a suitable reflective surface, a pseudo-lens can be constituted for not only a visible ray but also for electromagnetic waves in any wave-length from microwave, to vacuum ultraviolet rays and X-rays. The same thing is quite applicable to the wave motion of material such as ultrasonic waves.

In addition of the above described properties, the present complex reflection system can be applied by making the best use of the following characteristics:

(1) A change and movement of the mirror bodies is possible at every section;

(2) If using a selective reflective surface (selective adsorption surface), the system can be provided function both as a lens and a filter at the same time;

(3) In the case of treating a strong light flux, an overall temperature control can easily be held by directly cooling the back side of the mirrors, and others;

(4) It is advantageous in a large scale structure;

(5) If considering the phase difference in selection of groups of mirror surfaces, the convergence of incident rays is possible while holding the coherence of light, and, in the case of a group of paraboidal mirrors as shown in FIG. 2, a may be taken as an integer times of wave length; and (6) If a focal line is provided instead of a focal point, the system can easily follow the rays of the sun.

What is claimed is:

1. A complex reflecting system comprising:
    a plurality of parabolic reflective surfaces sharing a common focal point, wherein said common focal point is on a first side of said complex reflecting system;
    wherein incident electromagnetic waves impinge on said plurality of parabolic reflective surfaces from a second side of said complex reflecting system, and wherein said first and second sides are on opposite sides of said complex reflecting system.

2. The complex reflecting system of claim 1 wherein said incident electromagnetic waves impinge on concave surfaces of said parabolic reflective surface.

3. The complex reflecting system of claim 1 further comprising a further parabolic reflective surface located at the common focal point of said plurality of parabolic reflective surfaces.

4. A complex reflecting system comprising:
    a plurality of parabolic reflective surfaces sharing a common focal point, wherein said common focal point is on a first side of said complex reflecting system;
    wherein incident electromagnetic waves impinge on said plurality of reflective surfaces from said first side of said complex reflecting system, and wherein said incident electromagnetic waves impinge on convex surfaces of said parabolic reflective surfaces.

* * * * *